Feb. 25, 1936.　　　　H. K. MOORE　　　　2,031,844
MANUFACTURE OF CAUSTIC SODA
Filed Oct. 26, 1933
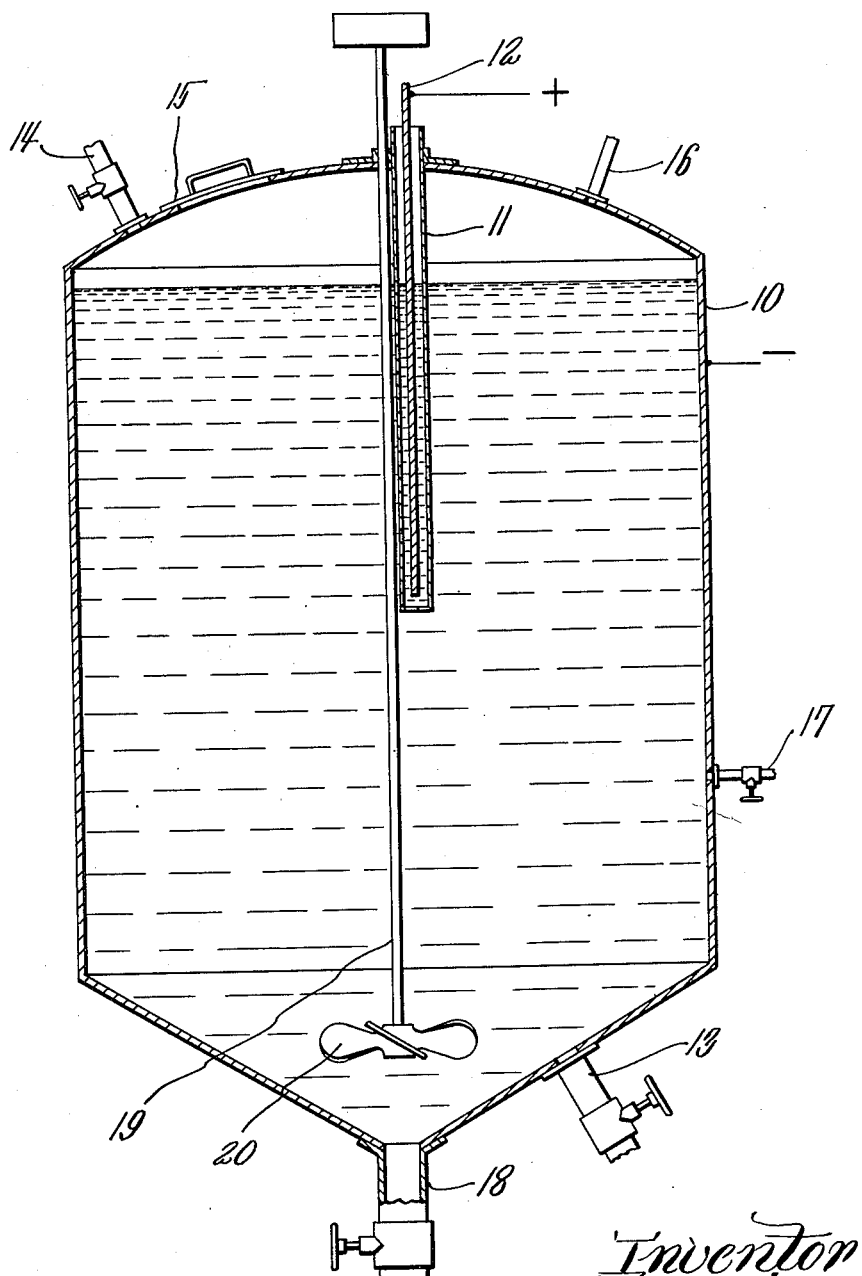
Inventor
Hugh K. Moore
By Wright, Brown, Quinby & May
Attys Patented Feb. 25, 1936

2,031,844

UNITED STATES PATENT OFFICE

2,031,844

MANUFACTURE OF CAUSTIC SODA

Hugh K. Moore, Berlin, N. H., assignor to Brown Company, Berlin, N. H., a corporation of Maine Application October 26, 1933, Serial No. 695,298

2 Claims. (Cl. 204—9)

This invention relates to the manufacture of caustic soda wherein one of the reactions relied upon is the causticization of a solution of sodium sulphide with copper oxide to produce a caustic soda solution and copper sulphide.

In manufacturing caustic soda involving the foregoing reaction, it is found that after the copper sulphide has been separated from the causticized solution and the solution is then subjected to concentration by the evaporation of water therefrom to a point where the caustic soda exists in a substantially dehydrated fused condition, the cooling of the fused caustic soda is accompanied by the generation of black compounds of a complex nature that blacken the solidified mass so that its utility and salability are greatly impaired. While it is possible to segregate the black compounds by dissolving the caustic soda repeatedly in water and repeatedly concentrating the solution by evaporation to a substantially dehydrated solid condition, nevertheless such practice is too expensive to be commercial, inasmuch as one of the prime cost factors in the production of caustic soda is that of evaporating the watery constituent from the caustic soda solution to produce the solid caustic soda of commerce. It may be mentioned that the impurities present in the original caustic soda solution, which give rise to the formation of the black compounds, are of such uncertain and complex nature that the solution shows no evidence whatever of the presence therein of such impurities either visually or by chemical tests. For instance, the original caustic soda solution is not only clear and water-white but does not even respond to the delicate tests for determining the presence therein of sulphides or of copper or iron compounds. Thus, when the sodium sulphide solution has been causticized with the cupric oxide, there is indication that the causticizing reaction has gone to completion for the reason that the addition of the usual silver nitrate reagent to the causticized solution does not yield a precipitate connoting the presence of residual sulphide therein. So, too, after the cupric sulphide precipitate has been removed from the causticized solution, a sample of the causticized solution, when acidified and treated with potassium ferrocyanide does not give the reddish brown coloration characteristic of the presence of copper compounds therein; nor does a sample of the acidified solution, when oxidized with nitric acid and treated with potassium sulphocyanate, give a red color indicative of the presence of iron compounds therein. The fact is, however, that all these elements, that is, sulphur, copper, and iron, may be present in the form of complex impurities in the causticized solution. While the black colored compounds may arise in substantially dehydrated caustic soda prepared by causticizing a sodium sulphide solution, no matter what its origin may be, with cupric oxide, nevertheless they invariably occur in caustic soda which has been prepared by thus causticizing sodium sulphide solutions which have originated from any of the naturally occurring sodium sulphates (Glauber salt) with which I have worked.

In my application Serial No. 670,882, filed May 13, 1933, I have disclosed a process by which caustic soda may be prepared from naturally occurring sodium sulphate, more particularly after the sodium sulphate has undergone purification by crystallization so as to rid it of clay, sand, etc. This process, which is based upon the conversion of the sodium sulphate into sodium sulphide by reactions presently to be described, suffers from the drawback that upon causticizing the sodium sulphide solution with cupric oxide and then bringing the resulting caustic soda to a substantially dehydrated solid form, the black compounds appear and discolor and degrade the caustic soda. As already indicated, the black compounds are of such complex nature that their origin is not understood at this time, but it has been determined that many, if not most of them, arise from impurities present in the naturally occurring sodium sulphate remaining therein after purification, and tending to combine with the metals and metal compounds with which they come in contact during the manufacture of the caustic soda.

I have succeeded in effecting a removal of these black compounds from the caustic soda solution and the present invention devolves more particularly upon the novel steps that I have taken to effect such removal. I have found that by electrolyzing the causticized solution through the action of a direct current at any stage of concentration, beginning with the dilute solution resulting from the causticization of the sodium sulphide solution with cupric oxide and ending with the substantially dehydrated caustic soda, it is possible to change the soluble complex impurities present in the solution into colloidally suspended compounds that can readily be removed from the solution. This may be done most advantageously after the causticized solution has been concentrated by the evaporation of its water content to a caustic soda content of, say, about 50% or greater, at which time, the concentrated caustic soda solution is transferred from the last stage evaporators to the settling tanks used before the solution goes into the melting kettles wherein the last portion of the water is vaporized and the caustic soda is fused or melted for discharge into drums or other containers for shipping. In such case, all that need be done accordant with my invention to the concentrated caustic soda solution while it is in the usual iron-walled settling tank is to electrolyze it, using the iron wall of the settling tank as the cathode and an alkali-resistant porous cup or diaphragm as the anode compartment to complete the electrolyzing cell. The anode compartment is preferably of comparatively small volume and preferably contains comparatively dilute, substantially pure caustic soda as the electro-conducting liquid. It is preferably made in the shape of a cup from such materials as asbestos paper, Portland cement, porous magnesia, etc. The oxygen liberated at the anode is permitted to escape in the atmosphere so that the anode compartment simply serves to complete the electrolyzing cell without being relied upon to effect any change, so far as I am aware, upon the caustic soda solution. Indeed, it is undesirable to permit the oxygen liberated thereat to diffuse through the solution being electrolyzed and undo the work done upon the impurities present in the solution by the cathode. It is thus seen that the solution undergoes an electrolysis by a direct current under conditions such that the solution is exposed substantially only to cathodic action or reactions ensuing in the cathode compartment. Under the influence of the direct current, the impurities present in the solution split up at the same time that the caustic soda in the solution undergoes electrolysis to discharge sodium ions and hydrogen at the cathode and oxygen at the anode. The impurities, which are believed to be oxides or oxygen-containing salts of a complex nature, are evidently reduced by the hydrogen and sodium ions at the cathode into sulphides, most of which are of a colloidal nature so fine that they are capable of passing through the finest filter papers or cloths. At any rate, these impurities are converted into forms quite different from those existent before the action of the electric current thereupon. Indeed, the water-white causticized solution progressively darkens as the electric current is being passed therethrough with the result that it finally becomes of a black inklike character, the particular degree of blackness depending upon the amount of impurities present in the original solution. This change in state of the impurities present in the solution is probably attributable to both the electrical treatment which they have undergone and the reducing action effected thereupon by the sodium and hydrogen liberated at the cathode. Such a conclusion is borne out by the fact that when the impure solution is put in the anode compartment, no change of color is apparent therein even though the solution undergoes electrolyzing action therein.

I have found that the dark-colored colloidal compounds thus formed in the solution can be coagulated by heating the solution to ebullition. The ebullition of the solution evidently brings about the collision of the colloidal particles and their coalescence into aggregates sufficiently coarse to settle out or to be removed by usual filtration, separation by settling being preferable over filtration because of the tendency of the agglomerated particles to plug filter paper or cloth. The completion of the transformation of the impurities into dark-colored compounds can be judged by taking a sample of the liquor, centrifugating the solids therefrom, decanting, and subjecting the decanted liquor to a test-electrolyzing treatment such as that already effected in the main electrolyzing bath. Should the test sample show no darkening upon further electrolyzing treatment, then the main bath can be regarded as having undergone a complete treatment. If, on the other hand, the test sample shows darkening of color upon further electrolyzing treatment, then the main bath should be subjected to further electrolyzing and boiling treatment to ensure the desired transformation of substantially all of the impurities. Inasmuch as the solution contains a relatively small amount of color-generating impurities, the electrical energy required for purifying a batch is exceedingly small, the precise amount of electrical energy depending, of course, upon the amount of impurities present in the original solution.

The complete process of producing caustic soda in accordance with my invention, using naturally occurring sodium sulphate as raw material, may be practiced generally as disclosed in my earlier-filed patent application. As disclosed in that application, barium sulphate is initially reduced in a kiln in the presence of finely divided carbon or carbonaceous material to barium sulphide, which is contaminated by some barium silicate on account of the siliceous impurities invariably present in commercial barium sulphate. The barium sulphide thus produced is caused by metathetical reaction in solution to convert the sodium sulphate into sodium sulphide, thereby reproducing the barium sulphate which may again be reduced to barium sulphide in the kiln. The kiln reaction products, after dry or wet pulverization, are preferably subjected to the leaching action of sufficient water to dissolve completely its barium sulphide content, this preferably being effected with intimate mixture of the kiln reaction products and the water so as to avoid settling of the heavy barium compounds. The leach solution is then allowed to stand quiescent to permit the settling of the residual barium sulphate, residual carbon or carbonaceous material, and the barium silicate formed as a side-reaction product. The supernatant barium sulphide solution is decanted and admixed with the sodium sulphate solution to effect the desired metathetical reaction, whereas the settled solids are returned to a kiln for further reducing action. The barium sulphate precipitated as a result of the metathetical reaction being in a pure or uncontaminated condition is preferably put through a kiln for reducing action independent or separate from the kiln into which the settled solids of the leach water are introduced, thereby avoiding recontamination of the subsequent barium sulphide solutions as well as of the barium sulphate. Such new impure barium sulphate as is necessary to compensate for barium losses in the process is preferably introduced into that kiln which receives the solids settling out of the leach waters. The clear sodium sulphide solution resulting from the metathetical reaction contains not only the monosulphides but also the polysulphides. It is desirable, in order to avoid side reaction products during causticization, to reduce the polysulphides to the monosulphide stage before causticization is effected. This is done by adding elemental copper in finely divided condition to the sulphide solution. If desired, however, the same results may be had by adding the elemental copper to the barium sulphide solution used in the metathetical reaction, inasmuch as the reduction of the barium polysulphides present in the barium sulphide solution to the monosulphide stage prior to the admixture of such solution with the sodium sulphate solution results in a sodium sulphide solution containing essentially only sodium monosulphide. Indeed, this latter procedure of reducing the barium sulphide solution to the monosulphide stage by the use of elemental copper is preferable when the barium sulphide precipitated during the metathetical reaction is to be recovered and sold as blanc fixe, rather than being introduced into a kiln for reduction to barium sulphide, as already described. Barium sulphate thus precipitated by the use of barium sulphide reduced to the monosulphide stage prior to its entry into the metathetical reaction is characterized by a high degree of whiteness, since the reduction of a sulphide solution associated with polysulphides to the monosulphide stage is accompanied by a change of color of the solution from a canary yellow to a water-white color.

The sodium sulphide solution containing essentially only sodium monosulphide is subjected to the causticizing reaction with cupric oxide, preferably the activated form of cupric oxide disclosed in my earlier-filed application. The activated form of cupric oxide therein disclosed causes a rapid and substantially complete causticization of the sulphide solution, accompanied by the liberation of considerable heat. As stressed in that application, the desulphurization of the sodium sulphide solution to the monosulphide stage prior to its causticization with cupric oxide is most desirable and important in view of the fact that the resulting caustic soda solution contains only a small amount of thiosulphate as side reaction product, whereas, if no desulphurization of the sodium sulphide solution to the monosulphide stage were effected, thiosulphate would be formed in abundance as side reaction product. The cupric sulphide sediment settling out of the causticized solution may be treated for the recovery of copper and sulphur as disclosed in my earlier-filed application, although I have since worked out a new recovery. Such new recovery may consist in smelting the copper sulphide as described in that application to produce copper oxide and sulphur dioxide, which latter gas, containing an excess of air, may be passed through a sodium sulphide solution to produce sodium thiosulphate according to the following reaction:—

$$Na_2S + O + SO_2 = Na_2S_2O_3$$

The sodium thiosulphate solution thus produced may be filtered and evaporated down sufficiently to give up substantially pure crystals of sodium thiosulphate ($Na_2S_2O_3.5H_2O$) which can be sold as a by-product.

The hot causticized solution is now prepared for the electrolyzing treatment of the present invention, although it may usually be concentrated to advantage to, say, about 50% solids content prior to such electrolyzing treatment. Thus, when the concentration of the solution is effected in steel equipment, as customary, the electrolyzing treatment may be performed on the concentrated solution while it is in the settling tanks immediately before delivery to the kettles. To this end, the concentrated solution may be delivered to settling tanks equipped so as to function as an electrolytic cell. A single tank so equipped is illustrated diagrammatically and conventionally on the accompanying drawing. As shown on the drawing, the iron wall 10 of the tank is supplied with direct electric current so as to constitute the cathode of the cell. The tank is shown with a valved liquor supply pipe 14, a manhole 15, and a vent 16, at its top, a valved sampling pipe 17 at its side, a valved drain pipe 18 at its hopper bottom, and a vertical stirrer or agitator 19 projecting through the top and journalled for rotation therein and terminating at its lower end in stirrer blades 20 adjacent to the hopper bottom. The anode compartment of the cell is defined by a receptacle 11 of comparatively small volume which may be formed of such material as asbestos paper, Portland cement, porous magnesia, or other suitable alkali-resistant material which, although sufficiently porous to permit the passage of an electric current through the conducting liquid maintained therein to the caustic soda solution in the cathode compartment or tank, nevertheless does not permit material diffusion of liquid therefrom into the solution in the tank. The solution in the tank, therefore, is substantially unaffected by what takes place in the anode compartment and can hence be considered as undergoing substantially only cathodic action. An electrode 12 of suitable conducting material such as platinum, nickel, iron, etc., is kept immersed in the solution maintained in the anode compartment and completes the electrical circuit of the cell. The receptacle defining the anode compartment is shown largely submersed in the impure caustic soda solution being subjected to electrolyzing action, whereas it preferably contains a substantially pure dilute caustic soda solution which can be renewed from time to time, should the anode be iron, nickel, or other conductor which reacts with the oxygen liberated thereat. The current density at the cathode is low, but the volume of liquor in contact therewith is great; the current density at the anode is great and the volume of liquor in contact therewith is exceedingly small. After only a few seconds of electrolyzing treatment, the impure liquor becomes inky in appearance but the treatment is continued for a few minutes so as to ensure the desired disruption of the complex impurities to a coagulable state. At this time, the current supply to the cell may be cut off and the liquor brought to boiling temperature as by the introduction of live steam directly thereinto through the steam-supply pipe 13 or by other suitable heating means. A slight ebullition of the liquor for a few minutes is usually sufficient to cause the colloidal particles of impurities to collide and aggregate into coarse particles tending to subside or capable of being removed by filtration. I have mentioned the electrolyzing treatment as being carried out in the settling tank to which the concentrated liquor is delivered for the reason that an extra step in the process is avoided, although, it is of course possible to carry out such treatment as a separate additional step at any other stage of the process after the causticized liquor has been produced. The purified liquor may be decanted as by siphoning from the combined electrolyzing and settling tank and delivered to the kettles wherein the solution is heated until it has become substantially dehydrated and the caustic soda fused, whereupon the fused caustic soda may be discharged into steel drums or other containers and therein permitted to solidify for shipment.

I must confess that I am at a loss at this time to state with certainty what impurities cause the generation of the black compounds which are removed in the combined electrolyzing and settling tank. All that I can say is that they are of an extremely complex nature and that they originate from soluble colorless impurities associated with the causticized liquor. As already indicated, many, if not most, of these soluble colorless impurities are formed during the process from the impurities present in the naturally occurring sodium sulphate and the metal and metal compounds used in this process, although small quantities are also produced even when chemically pure sodium sulphate is used as the starting material, indicating that they are inherent in the process itself. It is possible that the soluble colorless impurities exist in the form of a complex salt or mixture of complex salts containing copper, iron, sulphur, selenium, aluminum, silica, oxygen, etc. It is possible that such selenium as occurs in extremely minute quantities simply replaces sulphur in the complex salt or salts. Neither the physical effect of the direct electric current nor the chemical action effected on these impurities at either the cathode or anode are understood at this time, but the face remains that the net result is a split-up of the complex soluble impurities into simpler ones only in the cathode compartment, since the caustic soda solution, after electrolyzation, shows traces of sodium sulphide in solution whose formation is attributable to the reducing action that has gone on at the cathode. Even when the anode compartment contains the same kind of caustic soda solution as the tank proper, there is no evidence of any chemical action being effected in the anode compartment other than the expected liberation of oxygen thereat. When the anode compartment contains the same impure liquor as the tank proper and such anode liquor is electrolyzed in a cathode compartment, it exhibits the same darkening on account of the decomposition of its impurities as does an impure liquor initially electrolyzed in the cathode compartment. The anode compartment is of exceedingly small volume and is filled with comparatively dilute, substantially pure caustic soda solution in order to avoid removal therefrom of other than the impurities that are formed on account of the oxidation of the anode material. For instance, when a nickel anode is used, it becomes desirable after a period of use of such electrode to remove the nickel impurities from the anode caustic soda solution, which can be effected by various well known methods of precipitating and recovering dissolved nickel compounds. Because of the dilute character and the small volume of the caustic soda solution, comparatively little caustic soda is lost on account of its use in the anode compartment. In the case of inexpensive anode materials such as iron, the anode liquor would, of course, be discarded, because there would be no economic reason for effecting a recovery of the iron therefrom.

In the foregoing description, I have, for the sake of simplicity, alluded to solutions of sodium sulphide and also to solutions of barium sulphide. Strictly speaking, neither sodium sulphide nor barium sulphide exist in solution as such to any material extent. Thus, in the case of sodium sulphide, hydrolysis takes place in water so that the resulting solution is really one containing sodium hydroxide and sodium hydrosulphide. This hydrolysis may be written as follows:—

$$Na_2S + H_2O = NaOH + NaSH$$

In the case of barium sulphide, hydrolysis also takes place in water to produce a solution containing barium hydroxy hydrosulphide. This hydrolysis may be written as follows:—

$$BaS + H_2O = BaOHSH$$

It is to be understood, therefore, that in referring to solutions of sodium sulphide and of barium sulphide either in the foregoing description or in the appended claims, I am doing so merely for convenience of designation and mean to include thereby the products of hydrolysis, as hereinbefore explained.

I claim:

1. A method of purifying a body of caustic soda solution contaminated by dissolved complex impurities tending to blacken the solid caustic soda recovered by evaporating aqueous content of the solution which comprises exposing said body of solution to cathodic electrolyzing action while keeping only a small fraction of said body exposed to anodic electrolyzing action and out of circulatory communication but in electrical communication with the rest of said body, thereby splitting up said impurities to insoluble ones colloidally suspended in the solution and imparting an inky appearance thereto, heating the solution to ebullition to coagulate the colloidally suspended impurities in distinctly coarsened condition, and removing the coarsened impurities from the solution.

2. A method of purifying a body of caustic soda solution contaminated by dissolved complex impurities tending to blacken the solid caustic soda recovered by evaporating aqueous content of the solution which comprises exposing said body of solution to cathodic electrolyzing action while keeping only a small fraction of said body exposed to anodic electrolyzing action and out of circulatory communication but in electrical communication with the rest of said body, thereby splitting up said impurities to insoluble ones colloidally suspended in the solution and imparting an inky appearance thereto, introducing live steam into the solution to cause ebullition therein and to induce coagulation of the colloidally suspended impurities in distinctly coarsened condition, and removing the coarsened impurities from the solution.

HUGH K. MOORE.